(12) United States Patent
Kim et al.

(10) Patent No.: US 10,599,130 B2
(45) Date of Patent: Mar. 24, 2020

(54) METHOD AND SYSTEM FOR MANUFACTURING AN INTEGRATED CIRCUIT IN CONSIDERATION OF A LOCAL LAYOUT EFFECT

(71) Applicant: SAMSUNG ELECTRONICS CO., LTD., Suwon-si, Gyeonggi-do (KR)

(72) Inventors: Wootae Kim, Seoul (KR); Hyung-Ock Kim, Seoul (KR); Jaehoon Kim, Seoul (KR); Naya Ha, Seoul (KR); Ki-Ok Kim, Seoul (KR); Eunbyeol Kim, Daegu (KR); Jung Yun Choi, Suwon-si (KR); Sun Ik Heo, Hwaseong-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 136 days.

(21) Appl. No.: 15/867,939

(22) Filed: Jan. 11, 2018

(65) Prior Publication Data
US 2018/0210421 A1    Jul. 26, 2018

(30) Foreign Application Priority Data

Jan. 26, 2017 (KR) .................. 10-2017-0012967
Sep. 15, 2017 (KR) .................. 10-2017-0118835

(51) Int. Cl.
*G06F 17/50* (2006.01)
*G05B 19/4097* (2006.01)

(52) U.S. Cl.
CPC ..... *G05B 19/4097* (2013.01); *G06F 17/5072* (2013.01); *G05B 2219/45031* (2013.01); *G06F 2217/12* (2013.01); *Y02P 90/265* (2015.11)

(58) Field of Classification Search
CPC ...... G05B 19/4097; G05B 2219/45031; G06F 17/5072; G06F 2217/12; Y02P 90/265
USPC ............. 716/50–56, 110–115, 118–119, 122, 716/132–135, 139
See application file for complete search history.

(56) References Cited

U.S. PATENT DOCUMENTS

| | | | |
|---|---|---|---|
| 7,590,968 B1 * | 9/2009 | Becker | G06F 17/5068 716/54 |
| 8,037,433 B2 | 10/2011 | Chidambarrao et al. | |
| 8,621,409 B2 | 12/2013 | Lee et al. | |
| 8,707,230 B1 | 4/2014 | Hu et al. | |

(Continued)

FOREIGN PATENT DOCUMENTS

JP    3655064    6/2005

OTHER PUBLICATIONS

Berthelon et al., "Design/technology co-optimization of strain-induced layout effects in 14nm UTBB-FDSOI CMOS: enablement and assessment of continuous-RX designs", 2016 Symposium on VLSI Technology Digest of Technical Papers.

*Primary Examiner* — Nghia M Doan
(74) *Attorney, Agent, or Firm* — F. Chau & Associates, LLC

(57) ABSTRACT

A method of manufacturing an integrated circuit (IC) including instances of standard cells includes arranging a first instance and arranging a second instance adjacent to the first instance. The second instance has a front-end layer pattern corresponding to a context group of the first instance. The context group includes information about front-end layer patterns of instances, the front-end layer patterns causing a same local layout effect (LLE) on the first instance and arranged adjacent to the first instance.

17 Claims, 12 Drawing Sheets

(56) References Cited

U.S. PATENT DOCUMENTS

| | | |
|---|---|---|
| 8,726,207 B2 | 5/2014 | Jiang et al. |
| 8,732,640 B1 | 5/2014 | Krishnan et al. |
| 9,245,078 B2 | 1/2016 | Huang et al. |
| 9,342,647 B2 | 5/2016 | Chen et al. |
| 9,411,926 B2 | 8/2016 | Lee et al. |
| 9,418,200 B2 | 8/2016 | Chai et al. |
| 2016/0140279 A1 | 5/2016 | Zhu et al. |
| 2016/0378888 A1* | 12/2016 | Chidambarrao ...... G06F 17/505 716/135 |
| 2018/0032658 A1* | 2/2018 | Ha ...................... G06F 17/5072 |

\* cited by examiner (a) N-TYPE FinFET (b) P-TYPE FinFET

US 10,599,130 B2

METHOD AND SYSTEM FOR MANUFACTURING AN INTEGRATED CIRCUIT IN CONSIDERATION OF A LOCAL LAYOUT EFFECT

CROSS-REFERENCE TO RELATED APPLICATIONS

This application claims priority under 35 U.S.C. § 119 to Korean Patent Application No. 10-2017-0012967, filed on Jan. 26, 2017, and Korean Patent Application No. 10-2017-0118835, filed on Sep. 15, 2017, in the Korean Intellectual Property Office, the disclosures of which are incorporated by reference herein in their entirety.

TECHNICAL FIELD

Exemplary embodiments of the inventive concept relate to an integrated circuit (IC), and more particularly, to a method and a system for manufacturing an IC in consideration of a local layout effect (LLE).

DISCUSSION OF RELATED ART

An integrated circuit (IC) configured to process a digital signal may be designed based on standard cells. The IC may include instances of the standard cells, and instances corresponding to one standard cell may have the same structure, namely, the same layout. Instances may be arranged such that the IC may serve desired functions, and interconnections may be generated to electrically connect the instances, such that a layout of the IC may be generated.

Due to the miniaturization in semiconductor manufacturing processes, a standard cell including patterns formed in a plurality of layers may not only include patterns with a reduced size but also have a reduced size itself. Thus, the influence of a peripheral structure (e.g., a peripheral layout) of an instance of a standard cell included in an IC, upon this instance, may increase. The influence of the peripheral layout may be referred to as a local layout effect (LLE) or a layout-dependent effect (LDE).

SUMMARY

According to an exemplary embodiment of the inventive concept, a method of manufacturing an integrated circuit (IC) including instances of standard cells includes arranging a first instance and arranging a second instance adjacent to the first instance. The second instance has a front-end layer pattern corresponding to a context group of the first instance. The context group includes information about front-end layer patterns of instances, the front-end layer patterns causing a same local layout effect (LLE) on the first instance and arranged adjacent to the first instance.

According to an exemplary embodiment of the inventive concept, a method of manufacturing a semiconductor device including an IC includes designing the IC to generate layout data including instances of a standard cell, and manufacturing the IC using the layout data. Designing the IC includes arranging a first instance and arranging a second instance adjacent to the first instance in a first direction, and determining whether a front-end layer pattern of the second instance corresponds to a context group of the first instance. The context group of the first instance includes information about front-end layer patterns of the instances, the front-end layer patterns causing a same LLE on the first instance and located adjacent to the first instance.

According to an exemplary embodiment of the inventive concept, a computing system is configured to manufacture an IC including instances of standard cells. The computing system includes a memory configured to store information including procedures, and a processor configured to access the memory and execute the procedures. The procedures include an instance placer and a router. The instance placer is configured to arrange a first instance and a second instance, among the instances of standard cells. An active region of the second instance has a shape corresponding to a context group of the first instance. The router is configured to route the instances and generate a layout of the IC. The context group includes information about active regions of the instances, the active regions of the instances causing a same LLE on the first instance and located adjacent to the first instance.

BRIEF DESCRIPTION OF THE DRAWINGS

The above and other features of the inventive concept will be more clearly understood by describing in detail exemplary embodiments thereof with reference to the accompanying drawings.

DETAILED DESCRIPTION OF THE EMBODIMENTS

Figure 1:
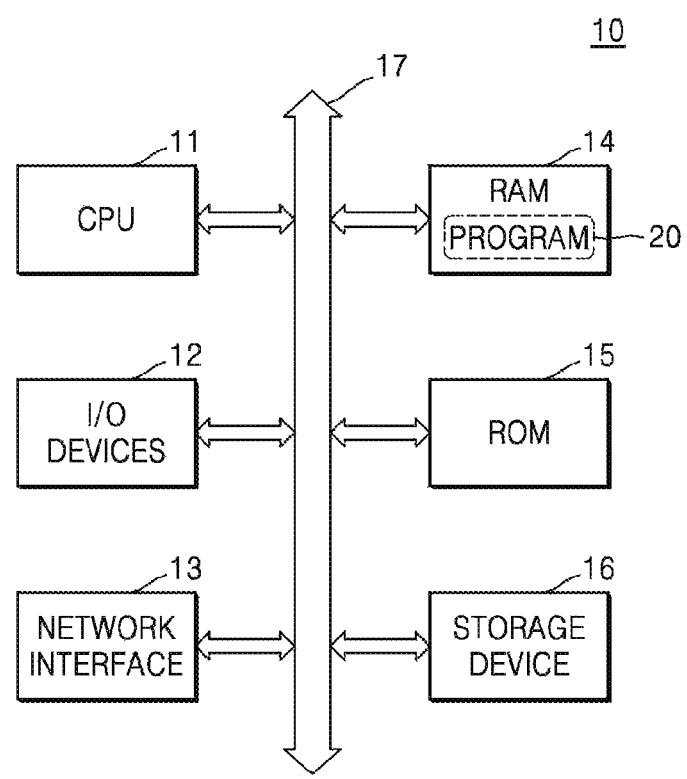
FIG. 1 is a block diagram of a computing system including a memory configured to store a program, according to an exemplary embodiment of the inventive concept.

Exemplary embodiments of the inventive concept provide a method of designing an integrated circuit (IC) in consideration of a local layout effect (LLE). More specifically, exemplary embodiments of the inventive concept provide a system and a method for generating a layout of an IC and manufacturing the IC based on an LLE.

Exemplary embodiments of the inventive concept will be more fully described hereinafter with reference to the accompanying drawings. Like reference numerals may refer to like elements throughout this application.

FIG. 1 is a block diagram of a computing system including a memory configured to store a program, according to an exemplary embodiment of the inventive concept. An operation of designing an integrated circuit (IC) according to an exemplary embodiment of the inventive concept may be performed by a computing system 10.

The computing system 10 may be a fixed computing system, such as a desktop computer, a workstation, and a server, or a portable computing system, such as a laptop computer. As shown in FIG. 1, the computing system 10 may include a central processing unit (CPU) 11, input/output (I/O) devices 12, a network interface 13, a random access memory (RAM) 14, a read-only memory (ROM) 15, and a storage device 16. The CPU 11, the I/O devices 12, the network interface 13, the RAM 14, the ROM 15, and the storage device 16 may be connected to a bus 17 and communicate with one another via the bus 17.

The CPU 11 may be referred to as a processing unit and include, for example, a core (e.g., a microprocessor (MP), an application processor (AP), a digital signal processor (DSP), or a graphic processing unit (GPU)), which may execute an arbitrary command set (e.g., Intel Architecture-32 (IA-32), 64-bit expansion IA-32, x86-64, PowerPC, Sparc, microprocessor without interlocked pipeline stages (MIPS), advanced RISC machines (ARM), or IA-64). For example, the CPU 11 may access a memory (e.g., the RAM 14 or the ROM 15) via the bus 17 and execute commands stored in the RAM 14 or the ROM 15. As shown in FIG. 1, the RAM 14 may store a program 20 according to an exemplary embodiment of the inventive concept or at least a portion thereof, and the program 20 may enable the CPU 11 to perform an operation of designing an IC. In other words, the program 20 may include a plurality of commands that may be executed by the CPU 11, and the plurality of commands included in the program 20 may enable the CPU 11 to perform operations of designing an IC according to exemplary embodiments of the inventive concept.

The storage device 16 may not lose stored data even if power supplied to the computing system 10 is cut off. For example, the storage device 16 may include a non-volatile memory, such as electrically erasable programmable read-only memory (EEPROM), flash memory, phase-change random access memory (PRAM), resistive RAM (RRAM), nano-floating gate memory (NFGM), polymer random access memory (PoRAM), magnetic RAM (MRAM), or ferroelectric RAM (FRAM), and a storage medium, such as a magnetic tape, an optical disc, or a magnetic disc. Additionally, the storage device 16 may be attachable to and detachable from the computing system 10. The storage device 16 may store the program 20 according to an exemplary embodiment of the inventive concept. Before the program 20 is executed by the CPU 11, the program 20 or at least part of the program 20 may be loaded from the storage device 16 into the RAM 14. The storage device 16 may store a file written in a program language, and the program 20, which is generated by a compiler, or at least part of the program 20, may be loaded into the RAM 14.

The storage device 16 may store data to be processed by the CPU 11 or data processed by the CPU 11. In other words, the CPU 11 may process data stored in the storage device 16 and generate new data, based on the program 20, and the generated data may be stored in the storage device 16. For example, the storage device 16 may store input data (refer to D010 in FIG. 3), which is processed by the program 20, or store layout data (refer to D100 in FIG. 3), which is generated by the program 20.

The I/O devices 12 may include an input device, such as a keyboard or a pointing device, and an output device, such as a display device or a printer. For example, by using the I/O devices 12, a user may trigger execution of the program 20 by the CPU 11, input the input data D010 of FIG. 3, or confirm the layout data D100 of FIG. 3 and/or an error message.

The network interface 13 may provide access to a network outside the computing system 10. For example, the network may include a plurality of computing systems and a plurality of communication links. The communication links may include wired links, optical links, wireless links, or links of different types. The input data D010 of FIG. 3 may be provided to the computing system 10 via the network interface 13 or provided to another computing system via the network interface 13.

Figure 2A:
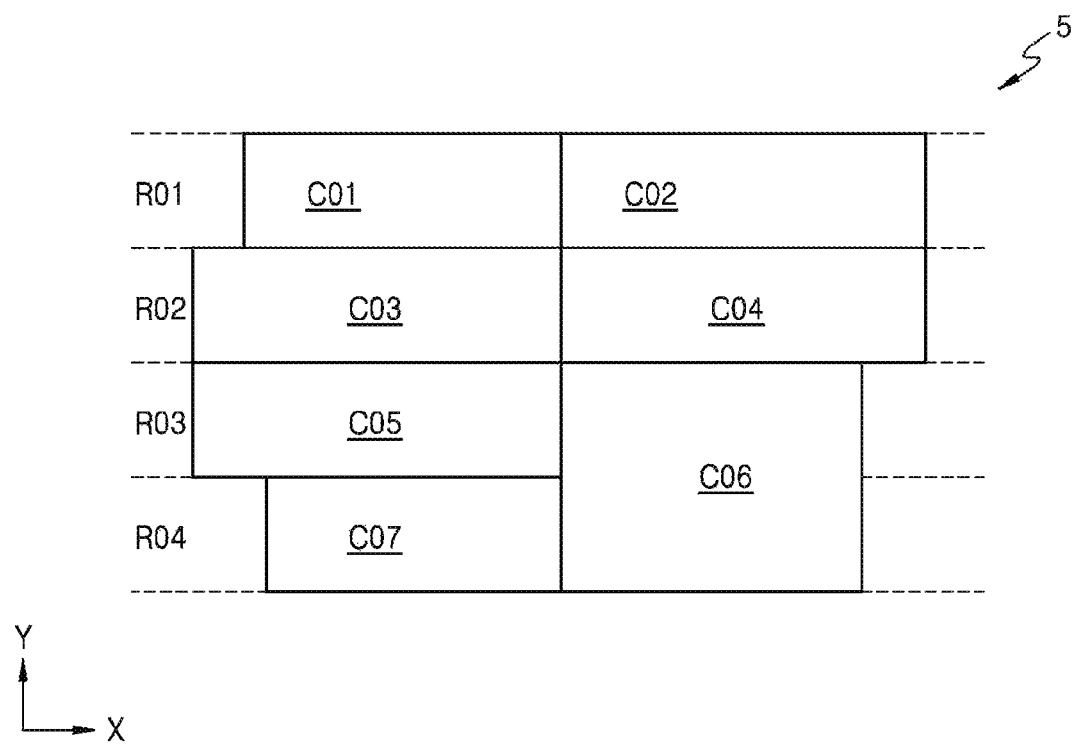
FIG. 2A illustrates a schematic layout of an integrated circuit (IC) according to an exemplary embodiment of the inventive concept.

FIG. 2A illustrates a schematic layout of an IC according to an exemplary embodiment of the inventive concept. In FIG. 2A, each of components included in an IC 5 may not be actually to scale but may be exaggerated for brevity.

Referring to FIG. 2A, the IC 5 may include instances C01 to C07 of standard cells. Instances corresponding to the same standard cell may have the same layout, and instances corresponding to different standard cells may have different layouts. The instances C01 to C07 may be aligned to a plurality of rows, for example, rows R01 to R04. The instances C01 to C07 may have a height H in a Y direction perpendicular to the rows R01 to R04 extending in an X direction. The instances C01 to C07 may have the same or different widths in the X direction parallel to the rows R01 to R04. Each of the rows R01 to R04 to which the instances C01 to C07 are aligned may have a height equal to the minimum height of the standard cells.

A standard cell to be included in the IC 5 may be selected from a cell library (e.g., D310 in FIG. 3) including information about a plurality of standard cells, based on physical characteristics of the standard cells (e.g., function and timing characteristics). An instance of the selected standard cell may be arranged to generate a layout of the IC 5.

An instance may have different physical characteristics from physical characteristics of a standard cell (e.g., intrinsic physical characteristics of the standard cell) according to a peripheral layout thereof. For example, a threshold voltage Vth and a drain saturation current Idsat of a transistor included in the instance may vary according to the peripheral layout of the layout. Thus, physical characteristics of the instance included in the IC 5 may be different from intrinsic physical characteristics of a standard cell, which are defined in the cell library. Thus, effects of the peripheral layout of the instance may be referred to as a local layout effect (LLE) or a layout dependent effect (LDE).

Physical characteristics (e.g., the threshold voltage Vth and the drain saturation current Idsat) of a transistor may vary according to patterns formed in a front-end layer (or front-end-of layer) formed in the vicinity of the transistor. The front-end layer may be a layer related to the formation of the transistor. The front-end layer may refer to a layer formed by a front-end-of-line (FEOL) that forms devices, such as a transistor, a capacitor, or a resistor, during a semiconductor manufacturing process.

According to an exemplary embodiment of the inventive concept, a method of designing an IC, which may be performed in the computing system 10 of FIG. 1, may be performed in consideration of an LLE. For example, as described below with reference to FIG. 3, the computing system 10 may arrange a second instance adjacent to a first instance in consideration of an LLE that occurs according to the patterns formed in the front-end layer. Thus, due to the LLE, a delay time or power loss of the first instance may be relatively reduced, and performance of the IC 5 may be improved.

Figure 2B:
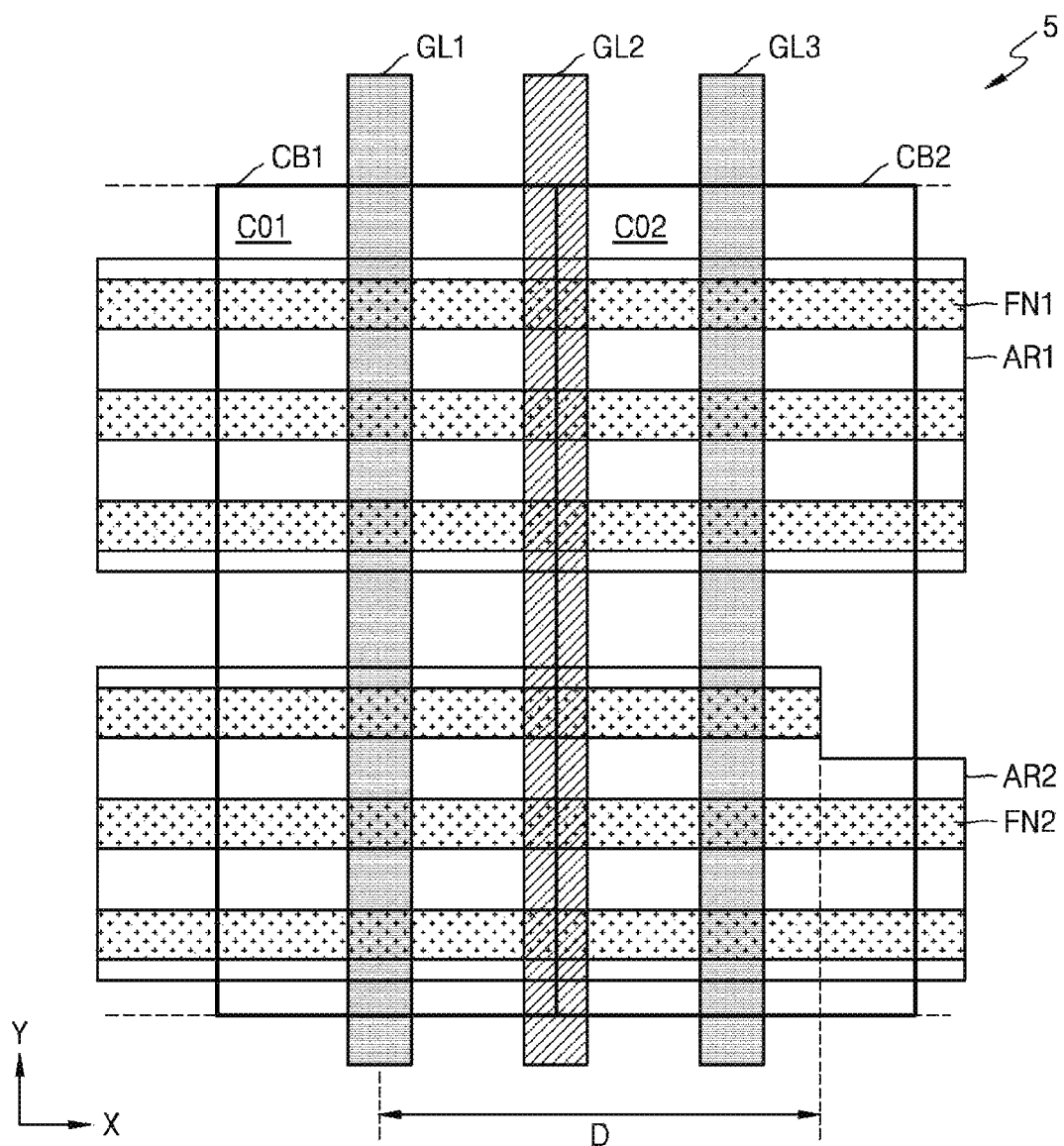
FIG. 2B illustrates a portion of the schematic layout of the IC of FIG. 2A according to an exemplary embodiment of the inventive concept.

FIG. 2B illustrates a portion of the schematic layout of the IC of FIG. 2A. FIG. 2B illustrates patterns formed in front-end layers of a first instance C01 and a second instance C02 included in the IC 5.

Referring to FIG. 2B, the first and second instances C01 and C02 may be defined by cell boundaries CB1 and CB2 and include a plurality of fins, for example, fins FN1 and FN2, first and second active regions (e.g., AR1 and AR2), and a plurality of gate lines, for example, gate lines GL1, GL2, and GL3. The cell boundaries CB1 and CB2 may be outlines defining the first and second instances C01 and C02, and a place and route (P&R) tool may recognize the first and second instances C01 and C02 by using the cell boundaries CB1 and CB2. The cell boundaries CB1 and CB2 may include four boundary lines.

The fins FN1 and FN2 may extend in a first direction (e.g., the X direction) and be located parallel to each other in a second direction (e.g., the Y direction) perpendicular to the first direction. The first active region AR1 and the second active region AR2 may be located parallel to each other and have different conductivity types. For example, the first active region AR1 may be an active region for a p-type fin field-effect transistor (FinFET), while the second active region AR2 may be an active region for an n-type FinFET.

In an exemplary embodiment of the inventive concept, three fins FN may be located in each of the first and second active regions AR1 and AR2. However, the inventive concept is not limited thereto, and the number of fins located in each of the first and second active regions AR1 and AR2 may be variously changed. For example, two fins may be located in each of the first and second active regions AR1 and AR2. In this case, the fins FN1 and FN2 located in the first and second active regions AR1 and AR2 may be referred to as active fins. Although FIG. 2B illustrates only active fins, the inventive concept is not limited thereto. The first and second instances C01 and C02 may further include dummy fins located in a region between the cell boundaries CB1 and CB2 and the first active region AR1, a region between the first and second active regions AR1 and AR2, or a region between the second active region AR2 and the cell boundaries CB1 and CB2.

The gate lines GL1, GL2, and GL3 may extend in the second direction (e.g., the Y direction) and be located parallel to one another in the first direction (e.g., the X direction). In this case, the gate lines GL1, GL2, and GL3 may include an arbitrary material having electrical conductivity, for example, polysilicon (poly-Si), a metal, a metal alloy, etc. In this case, the gate line GL2 located at an interface surface adjacent to the first instance C01 and the second instance C02 may be a dummy gate line.

Physical characteristics of the first instance C01 may be changed due to an LLE caused by the second instance C02 located adjacent to the first instance C01. The LLE may depend on shapes of patterns of a front-end layer of the second instance C02. For example, the LLE may depend on shapes of the first and second active regions AR1 and AR2 located in the second instance C02 and the number of fins (e.g., FN1 and FN2) included in the first and second active regions AR1 and AR2. A variation in LLE relative to the shape of the front-end layer patterns will be described below with reference to FIG. 6.

In the computing system 10 according to an exemplary embodiment of the inventive concept, when the second instance C02 is located adjacent to the first instance C01, the second instance C02 may be located in consideration of an LLE on the first instance C01 according to the shape of the front-end layer patterns of the second instance C02. Accordingly, the computing system 10 may use the LLE on the first instance C01 to increase performance of the IC 5.

Figure 3:
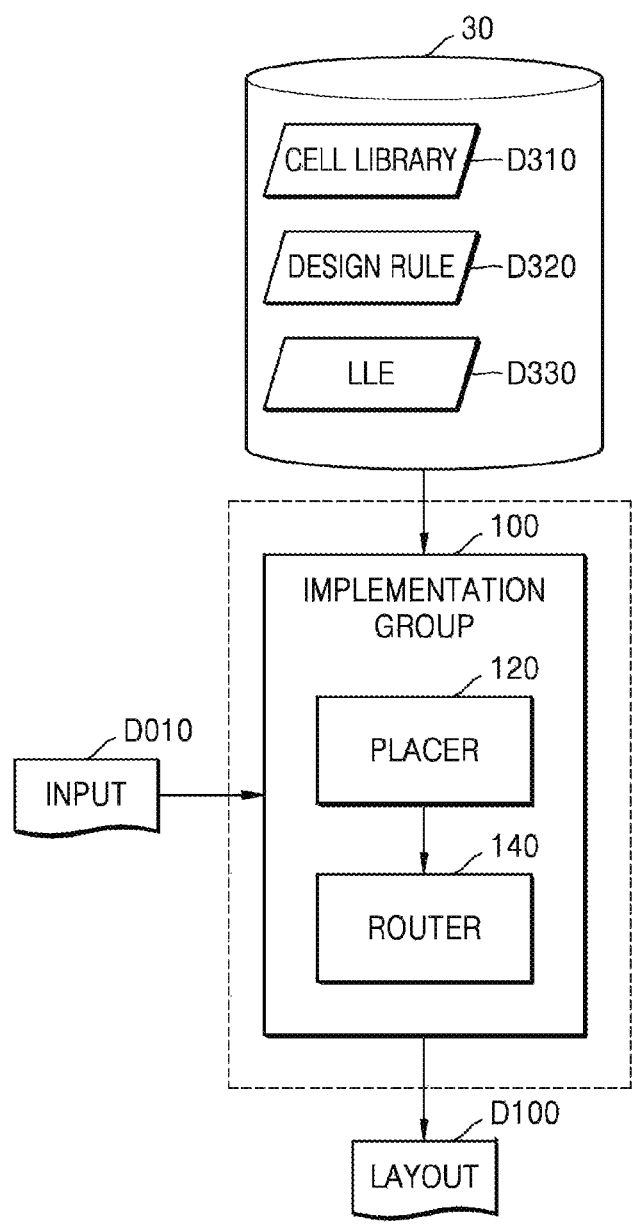
FIG. 3 is a block diagram of the program of FIG. 1, according to an exemplary embodiment of the inventive concept.

FIG. 3 is a block diagram of the program of FIG. 1, according to an exemplary embodiment of the inventive concept. As described above with reference to FIG. 1, the program 20 may include a plurality of commands, which may enable the CPU 11 to perform an operation of designing an IC according to an exemplary embodiment of the inventive concept. All components of the program 20, which are shown in FIG. 3, may be stored in the RAM 14 of FIG. 1. Alternatively, at least some of the components of the program 20 may be stored in the RAM 14 of FIG. 1, and others thereof may be stored in the ROM 15 of FIG. 1 or the storage device 16.

Referring to FIG. 3, the program 20 may include an implementation group 100, which may include a plurality of procedures, for example, a placer 120 and a router 140. The procedures may refer to a series of commands to perform a specific task. A procedure may be referred to as a function, a routine, a subroutine, or a subprogram. Each of the procedures may process external data (e.g., D010) or data generated by another procedure. Herein, when the CPU 11 of FIG. 1 executes a procedure (e.g., the placer 120 or the router 140) and performs an operation, it may be inferred that the procedure (e.g., the placer 120 or the router 140) performs the operation.

A cell library D310, a design rule D320, and LLE data D330 may be stored in the storage medium 30. For example, the storage medium 30 may be the storage device 16 of FIG. 1. The cell library D310 may include information about physical characteristics of a plurality of standard cells, for example, at least one of function information, timing information, layout information, and power information. In an exemplary embodiment of the inventive concept, the cell library D310 may include information about standard cells, which may serve the same function but have different active region patterns of a front-end layer. For example, the cell library D310 may include information about standard cells, which may serve the same function and have active region patterns of a front-end layer, which are symmetric to one another.

The design rule D320 may include rules to be observed by the layout of the IC to manufacture the IC by using a semiconductor process and/or prevent degradation of the performance of the IC.

The LLE data D330 may include information about patterns formed in front-end layers of the standard cells, which is stored in the cell library D310. In an exemplary embodiment of the inventive concept, information about the patterns formed in the front-end layers that cause the same LLE may fall into one context group, and the LLE data D330 may include information about a plurality of context groups. For example, a context group of the LLE data D330 may include information about the patterns formed in the front-end layers of the standard cells, which cause an LLE, to reduce delay times of adjacent standard cells. Alternatively, the context group of the LLE data D330 may include information about the patterns formed in the front-end layers of the standard cells, which cause an LLE, to reduce power consumption of adjacent standard cells. In an exemplary embodiment of the inventive concept, the context group may include information about a shape of an active region (e.g., the number of active fins) at an interface surface adjacent to a target standard cell. The target standard cell may be a standard cell which is the target of an appropriate LLE.

The implementation group 100 may refer to data D310, D320, and D330 stored in the storage medium 30 and generate layout data D100 from the input data D010. The input data D010, which may be data defining an IC, may include, for example, a netlist including information about instances of standard cells and electrical connection relationships among the instances. Additionally, the input data D010 may further include information about requirements of an IC, for example, timing conditions, power conditions, and area conditions. The implementation group 100 generate layout data D100 including physical information about the layout of the IC from the input data D010.

In an exemplary embodiment of the inventive concept, the implementation group 100 may refer to the data D310, D320, and D330 stored in the storage medium 30 and generate layout data D100 about the arrangement of instances with reference to a context group corresponding to IC requirements included in the input data D010. Accordingly, physical characteristics (e.g., a front-end layer) of a second instance arranged adjacent to a first instance of the target standard cell may be determined, and the layout data D100 may be generated based on the physical characteristics of the second instance. For example, the implementation group 100 may determine the number of a plurality of fins included in an active region of the second instance so as to change a shape of the active region of the second instance at an interface surface adjacent to the first instance.

The placer 120 of the implementation group 100 may arrange instances defined in the input data D010 with reference to the cell library D310. The placer 120 may obtain layouts of the instances defined in the input data D010 with reference to the cell library D310 and arrange instances (e.g., the layouts of the instances) based on information about the IC requirements included in the input data D010 and the design rule D320.

The placer 120 may arrange the first instance and arrange the second instance adjacent to the first instance in a region in which the first instance is not arranged. To cause an appropriate LLE on the first instance, the placer 120 may refer to the LLE data D330 and the design rule D320 and arrange the second instance having a shape of a front-end layer pattern corresponding to a context group of the first instance based on information about the context group included in the LLE data D330.

However, the inventive concept is not limited to a case in which the placer 120 sequentially arranges the first instance and the second instance. For example, the placer 120 may arrange the first instance and the second instance simultaneously. The placer 120 may refer to the LLE data D330 and the design rule D320 and rearrange instances including the second instance based on the information about the context group included in the LLE data D330, as will be described below with reference to FIGS. 7 and 8.

The router 140 may generate interconnections configured to electrically connect the instances arranged by the placer 120. For example, the router 140 may generate interconnections including patterns and/or vias, which are formed in interconnection layers, by using a routing resource, e.g., a plurality of interconnection layers and a plurality of vias. The router 140 may generate the interconnections based on information about a connection relationship among the instances defined in the input data D010 and the design rule D320. Additionally, the router 140 may generate the interconnections based on the information about the IC requirements included in the input data D010.

Figure 4:
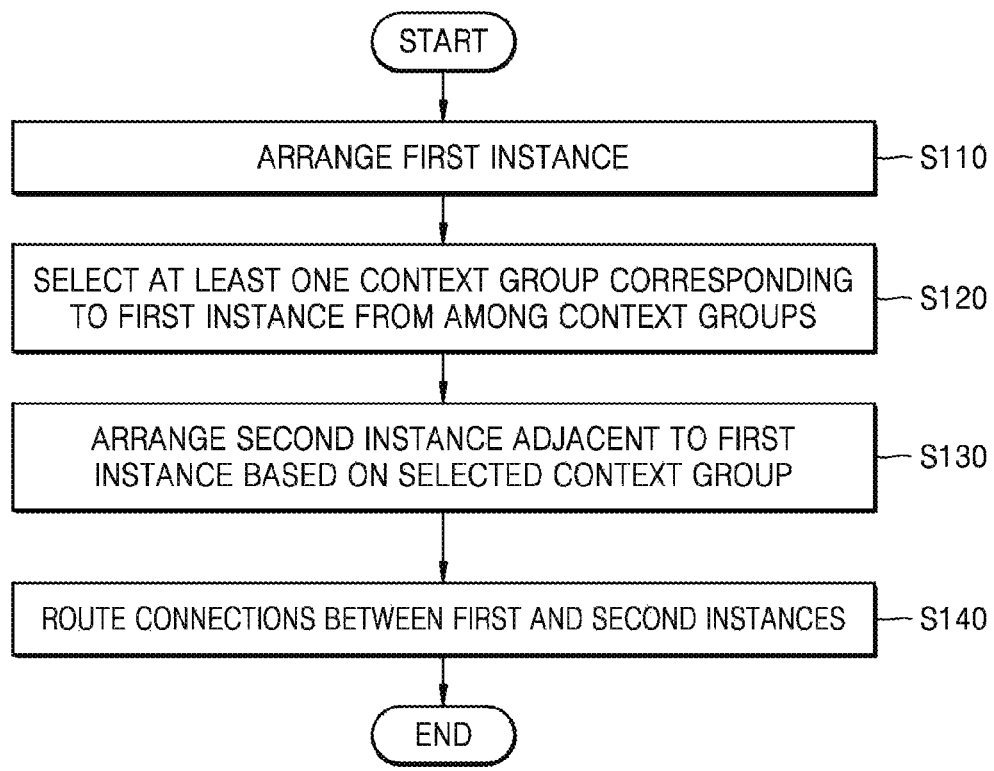
FIG. 4 is a flowchart of a method of designing an IC, according to an exemplary embodiment of the inventive concept.

FIG. 4 is a flowchart of a method of designing an IC according to an exemplary embodiment of the inventive concept. FIG. 4 illustrates a method of generating a layout of the IC in consideration of an LLE, and the method of FIG. 4 may be performed by the implementation group 100 of FIG. 3.

Referring to FIG. 4, an operation of locating a first instance of a target standard cell may be performed (S110). The first instance may be defined by the input data D010 and arranged in consideration of the design rule D320. The target standard cell may be a standard cell which is the target of an appropriate LLE.

At least one context group corresponding to the first instance may be selected from among the plurality of context groups included in the LLE data D330 in consideration of characteristics of the target standard cell (S120). Each of the plurality of context groups may include contexts of front-end layer patterns that cause the same LLE on adjacent instances. Accordingly, a context group may be selected depending on whether it is important to reduce a delay time of the first instance or whether it is important to reduce power consumption of the first instance.

A shape of a front-end layer pattern formed at an interface surface adjacent to the first instance may be determined based on the selected context group, and a second instance including the front-end layer pattern may be located adjacent to the first instance (S130). The second instance, which is an instance of a standard cell, may be located to observe the design rule D320.

An operation of routing connections between the first instance and the second instance may be performed (S140). For example, interconnections configured to connect the first instance and the second instance may be generated, and information about the arrangement of the first instance and the second instance and the layout data D100 including physical information about the interconnections may be generated.

Therefore, in the method of designing the IC according to an exemplary embodiment of the inventive concept, since the second instance is arranged in consideration of an LLE to act on the first instance, performance of the IC may be improved.

Figure 5:
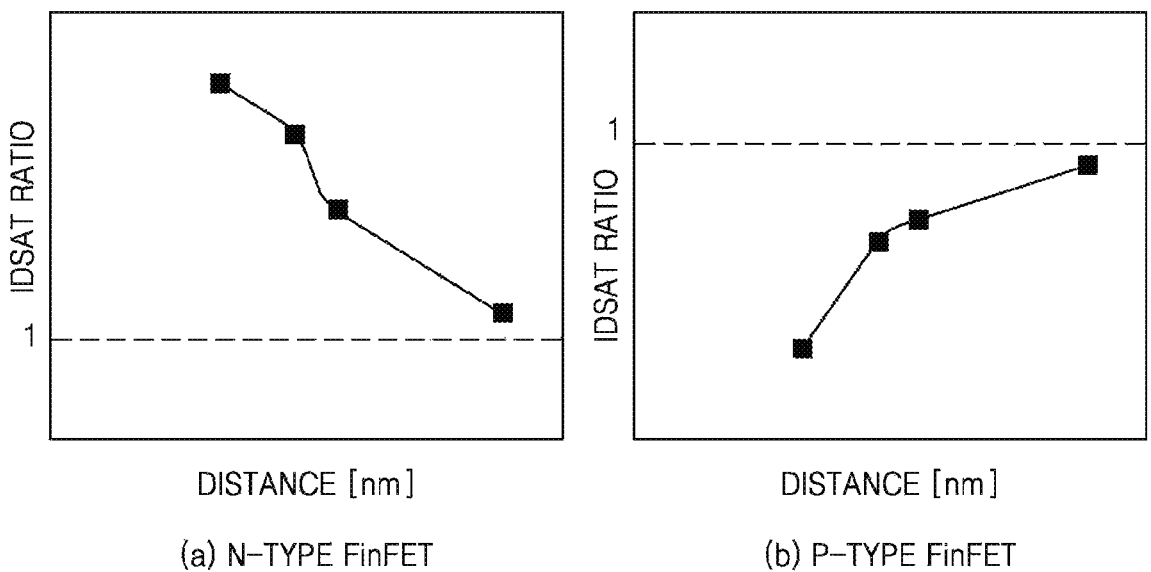
FIG. 5 is a graph showing a local layout effect (LLE) on a target standard cell according to an exemplary embodiment of the inventive concept.

FIG. 5 is a graph showing an LLE on a target standard cell according to an exemplary embodiment of the inventive concept.

Referring to FIGS. 2B and 5, a variation in drain saturation current Idsat of the first instance C01 relative to shapes of active regions AR1 and AR2 of the second instance C02 may be seen. The second instance C02 may be located adjacent to the first instance C01 of the target standard cell.

The shapes of the active regions AR1 and AR2 of the second instance C02 may be changed as the number of fins included in the active regions AR1 and AR2 is reduced. Each of the active regions AR1 and AR2 may have an L shape at a point in which the shapes of the active regions AR1 and AR2 are changed. For example, each of the active regions AR1 and AR2 may be formed in the L shape when the number of fins included in each of the active regions AR1 and AR2 is reduced from 3 to 2.

Referring to (a) of FIG. 5, in an n-type FinFET, as a distance D from the center of the first instance C01 to the L shape of the first active region AR1 or the second active region AR2 of the second instance C02 increases, the drain saturation current Idsat may be reduced. In contrast, referring to (b) of FIG. 5, in a p-type FinFET, as a distance from the center of the first instance C01 to the L shape of the first active region AR1 or the second active region AR2 of the second instance C02 increases, the drain saturation current Idsat may increase.

When the first instance C01 is included in a critical timing path, the second instance C02 in which an active region (e.g., the second active region AR2) having an n-type FinFET has an L-shaped layout may be arranged adjacent to the first instance C01. In this case, as the L shape is located closer to the first instance C01, a delay time may be reduced.

In an exemplary embodiment of the inventive concept, information about a shape of an active region (e.g., the second active region AR2) having an n-type FinFET and information about the distance D from the center of the first instance C01 to the L shape of the second active region AR2 may be included as one context group in the LLE data D330 stored in the storage medium 30 of FIG. 3.

In contrast, when the first instance C01 is not included in the critical timing path, to reduce power consumption of the first instance C01, the second instance C02 in which an active region (e.g., the first active region AR1) having a p-type FinFET has an L-shaped layout may be arranged adjacent to the first instance C01. In this case, as the L shape is located closer to the first instance C01, power consumption may be reduced.

In an exemplary embodiment of the inventive concept, information about a shape of an active region (e.g., the first active region AR1) having a p-type FinFET and information about the distance D from the center of the first instance C01 to the L shape of the first active region AR1 may be included as one context group in the LLE data D330.

Figure 6:
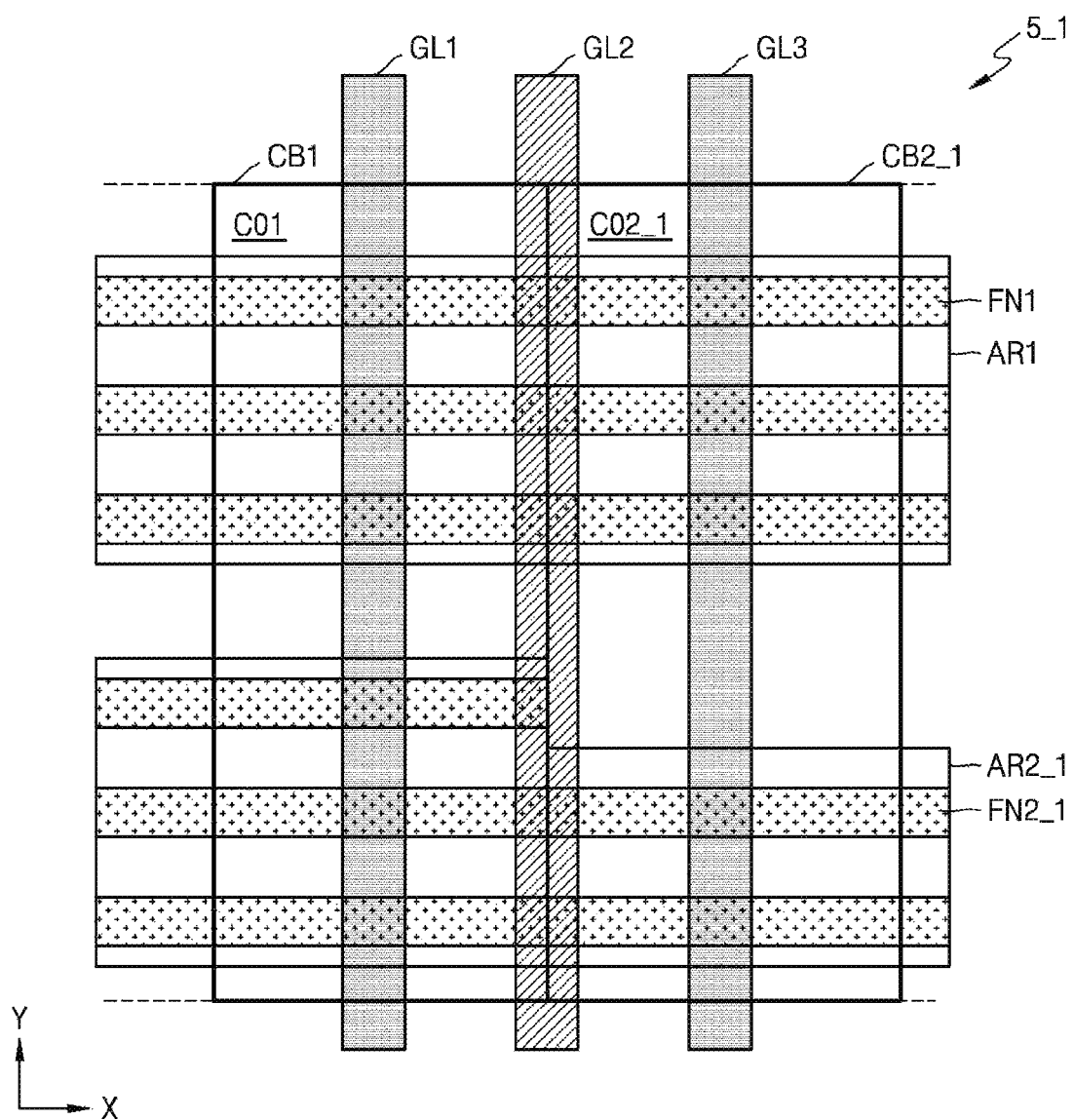
FIG. 6 illustrates a portion of a schematic layout of an IC according to an exemplary embodiment of the inventive concept.

FIG. 6 illustrates a portion of a schematic layout of an IC according to an exemplary embodiment of the inventive concept. In particular, FIG. 6 illustrates patterns formed in front-end layers of the first instance C01 and a second instance C02_1 included in an IC 5_1.

Referring to FIGS. 4 and 6, the first instance C01 may be located in the layout of the IC 5_1. In an exemplary embodiment of the inventive concept, the first instance C01 may be included in a critical timing path. A context group by which a delay time is relatively reduced may be selected from among a plurality of context groups included in the LLE data D330 in consideration of an LLE caused by instances located adjacent to the first instance C01 (S120). However, the inventive concept is not limited thereto, and a context group of the first instance C01 corresponding to another LLE to act on the first instance C01 may be selected from among the plurality of context groups. The selected context group may include information about a shape of an active region, by which an active region (e.g., the second active region AR2_1) having an n-type FinFET may have an L shape, and information about a position of the L shape.

Accordingly, the second active region AR2_1 of the first instance C01 may include three fins, and the second instance C02_1 including two fins may be located adjacent to the first instance C01 in the second active region AR2_1 (S130), e.g., as shown by fins FN2_1 in FIG. 3. Thus, the L shape of the second active region AR2_1 may be formed at an interface surface between the first instance C01 and the second instance C02_1. Accordingly, the distance D from the center of the first instance C01 to the L shape of the second active region AR2_1 may be reduced, so that a delay time caused by an LLE can be reduced.

However, the inventive concept is not limited to a case in which the second instance C02_1 is arranged such that the L shape of the second active region AR2_1 is formed at the interface surface between the first instance C01 and the second instance C02_1. In other words, the L shape may not be formed in the second active region AR2_1 of the second instance C02_1. Additionally, the second active region AR2_1 of the first instance C01 may include three or more fins, and the second active region AR2_1 of the second instance C02_1 may include two or more fins.

Although FIG. 6 illustrates only the shape of the front-end layer pattern of the second instance C02_1, which may reduce the delay time, the inventive concept is not limited thereto. To reduce power consumption of a target standard cell, a context group by which power consumption is relatively reduced may be selected from among the plurality of context groups included in the LLE data D330. The selected context group may include information about a shape of an active region, by which an active region (e.g., the first active region AR1) having a p-type FinFET has an L shape, and information about a position of the L shape. Accordingly, three fins may be located in the first active region AR1 of the first instance C01, and the second instance C02_1, of which the first active region AR1 includes two fins, may be located adjacent to the first instance C01.

Figure 7:
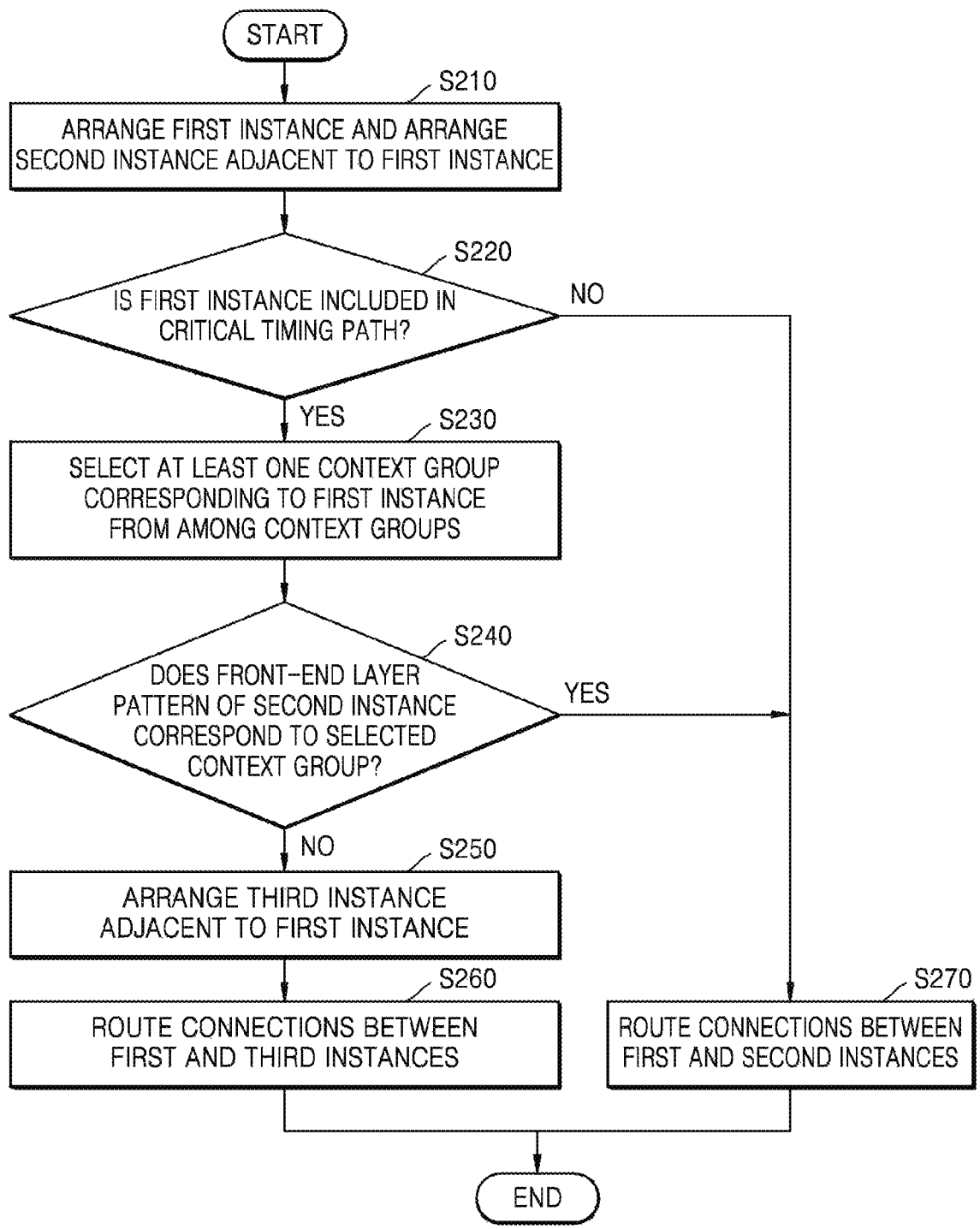
FIG. 7 is a flowchart of a method of designing an IC, according to an exemplary embodiment of the inventive concept.

FIG. 7 is a flowchart of a method of designing an IC according to an exemplary embodiment of the inventive concept. The method shown in FIG. 7 may be performed by the implementation group 100 of FIG. 3. When compared with the flowchart of FIG. 4, FIG. 7 may be characterized by arranging a second instance adjacent to a first instance and rearranging an instance in the vicinity of the first instance in consideration of an LLE on the first instance.

Referring to FIG. 7, an operation of locating the first instance and locating the second instance adjacent to the first instance may be performed (S210). The first instance and the second instance may be defined by the input data D010 of FIG. 3 and located in consideration of the design rule D320 of FIG. 3.

It may be determined whether the first instance is included in a critical timing path with reference to the input data D010 (S220). When the first instance is included in the critical timing path, at least one context group corresponding to the first instance may be selected from among a plurality of context groups included in the LLE data D330 of FIG. 3 (S230). For example, the selected context group may include information about a shape of a front-end layer pattern by which a delay time may be reduced. Accordingly, a shape of a front-end layer pattern of an instance adjacent to the first instance may be determined based on the selected context group.

It may be determined whether a front-end layer pattern of the second instance corresponds to the selected context group (S240). It may be determined whether the front-end layer pattern of the second instance corresponds to the selected context group, based on a front-end layer pattern of an interface surface between the first instance and the second instance.

When the front-end layer pattern of the second instance has a different shape from the selected context group, the second instance may be eliminated. A third instance of which a front-end layer pattern has a shape corresponding to the selected context group may be arranged adjacent to the first instance (S250).

Although the third instance serves substantially the same function as the second instance, the front-end layer pattern of the third instance may have a different shape from the front-end layer pattern of the second instance. In particular, the front-end layer pattern of the third instance may have a different shape from the front-end layer pattern of the second instance at a surface between the third instance and the first instance. For example, the second instance may include the same front-end layer pattern as the second instance C02 of FIG. 2B, and the third instance may include the same front-end layer pattern as the second instance C02_1 of FIG. 7.

When the third instance is located adjacent to the first instance, an operation of routing connections between the first instance and the third instance may be performed (S260). For example, interconnections configured to connect the first instance with the third instance may be generated, and the layout data D100 of FIG. 3 including information about arrangement of the first instance and the third instance and physical information about the interconnections may be generated.

When the first instance is not included in the critical timing path (S220: NO) or the front-end layer pattern of the second instance corresponds to the selected context group (S240: YES), an operation of routing connections between the first instance and the second instance may be performed (S270). For example, interconnections configured to connect the first instance with the second instance may be generated, and the layout data D100 including information about arrangement of the first instance and the second instance and physical information about the interconnections may be generated.

Although FIG. 7 illustrates only an operation of determining whether the first instance is included in the critical timing path, the inventive concept is not limited thereto. When the first instance is limited in power consumption, at least one context group corresponding to a power-consumption reduction effect may be selected from among the plurality of context groups included in the LLE data D330. Based on the selected context group, a third instance, which serves substantially the same function as the second instance and of which a front-end layer pattern has a different shape from the front-end layer pattern of the second instance, may be arranged adjacent to the first instance.

In the method of designing the IC according to an exemplary embodiment of the inventive concept, since the second instance is arranged in consideration of an LLE to act on the first instance, performance of the IC may be improved.

Figure 8:
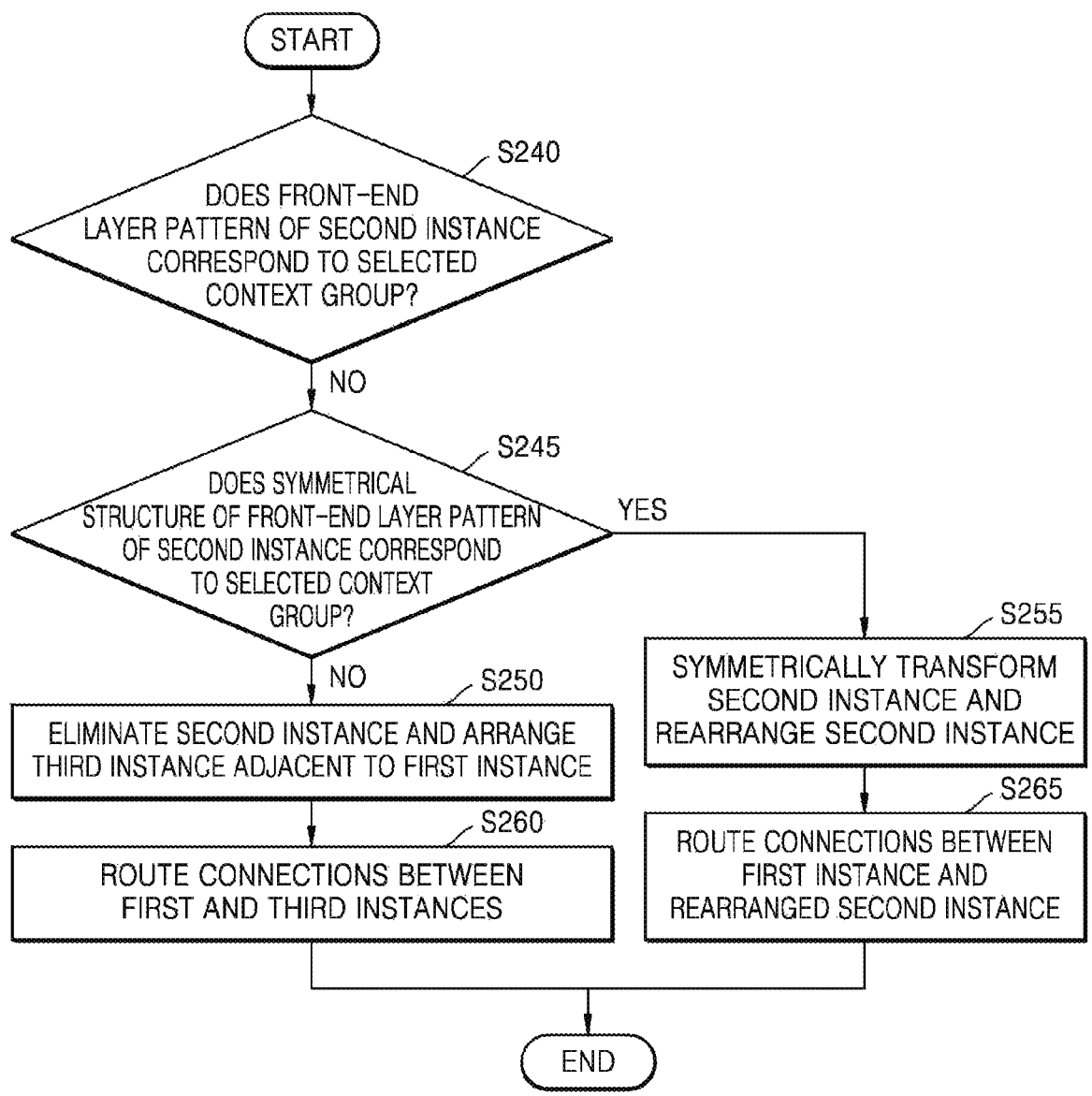
FIG. 8 is a flowchart of a method of designing an IC, according to an exemplary embodiment of the inventive concept.

FIG. 8 is a flowchart of a method of designing an IC according to an exemplary embodiment of the inventive concept. The method shown in FIG. 8 may be performed by the implementation group 100 of FIG. 3. When compared with the flowchart of FIG. 7, FIG. 8 may be characterized by rearranging a second instance in consideration of an LLE. In the flowchart of FIG. 8, operations S210, S220, S230, S240, and S270 may be substantially the same as in FIG. 7, and FIG. 8 shows operation S240 and operations subsequent thereto.

Referring to FIG. 8, it may be determined whether a front-end layer pattern of the second instance corresponds to the selected context group (S240). It may be determined whether the front-end layer pattern of the second instance corresponds to the selected context group, based on a front-end layer pattern of an interface surface between the first instance and the second instance.

When the front-end layer pattern of the second instance does not correspond to the selected context group, it may be determined whether a symmetrical structure of the front-end layer pattern of the second instance corresponds to the selected context group (S245). For example, when the front-end layer pattern of the second instance at the interface surface adjacent to the first instance does not correspond to the selected context group, it may be determined whether the front-end layer pattern of the second instance at a surface opposite to a surface adjacent to the first instance corresponds to the selected context group.

When the symmetrical structure of the front-end layer pattern of the second instance corresponds to the selected context group, the second instance may be symmetrically transformed and rearranged (S255). For example, when the first instance and the second instance are arranged adjacent to each other in a first direction, the second instance may be symmetrically transformed about an axis perpendicular to the first direction and rearranged. Subsequently, an operation of routing connections between the first instance and the rearranged second instance may be performed (S265).

When the symmetrical structure of the front-end layer pattern of the second instance does not correspond to the selected context group, the second instance may be eliminated, and a third instance that serves substantially the same function as the second instance and of which the front-end layer pattern has a different shape from the front-end layer pattern of the second instance may be located adjacent to the first instance (S250). The front-end layer pattern of the third instance may correspond to the selected context group. Subsequently, an operation of routing connections between the first instance and the third instance may be performed (S260).

Figure 9A:
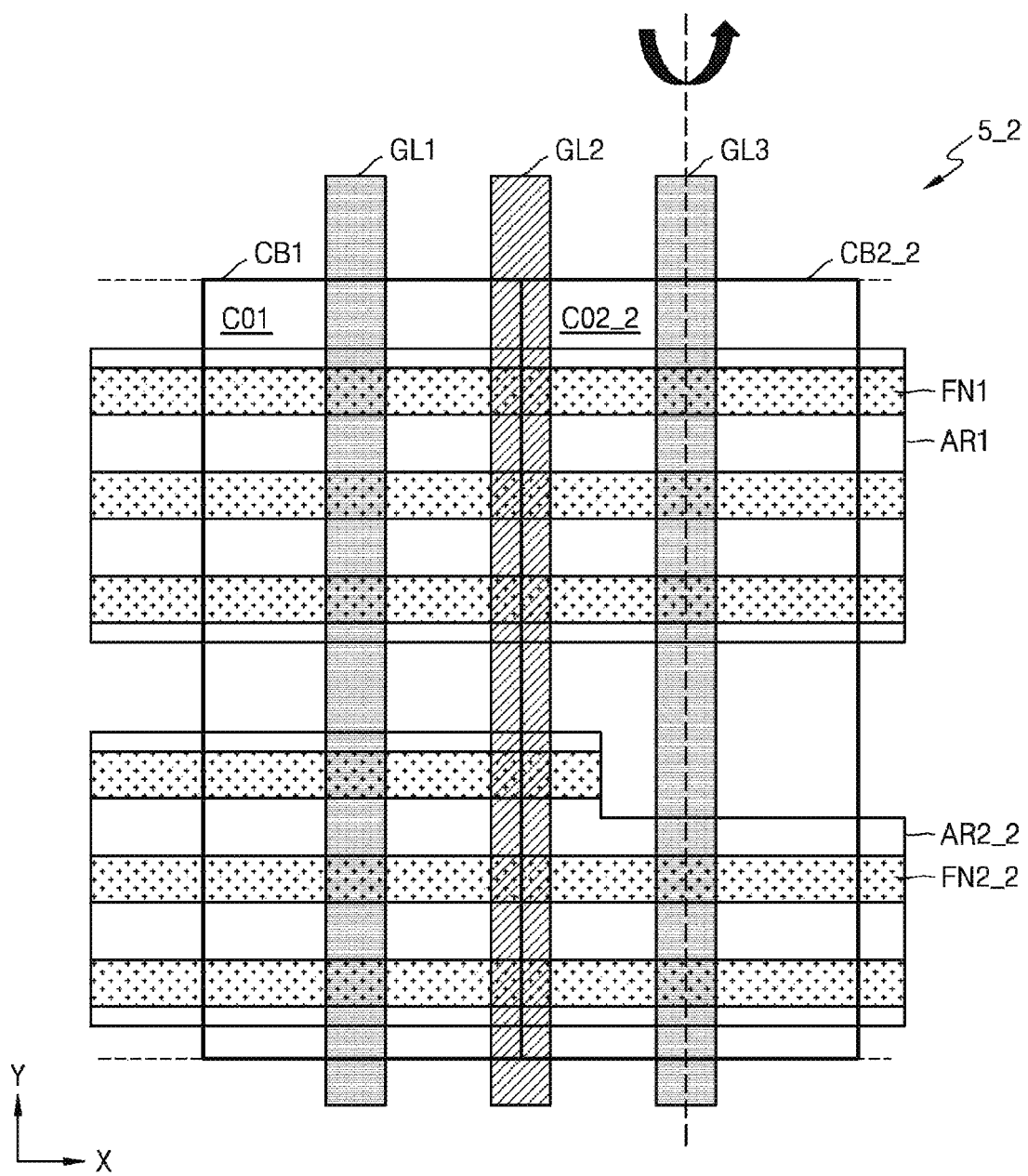
FIGS. 9A and 9B illustrate portions of schematic layouts of ICs according to exemplary embodiments of the inventive concept.
Figure 9B:
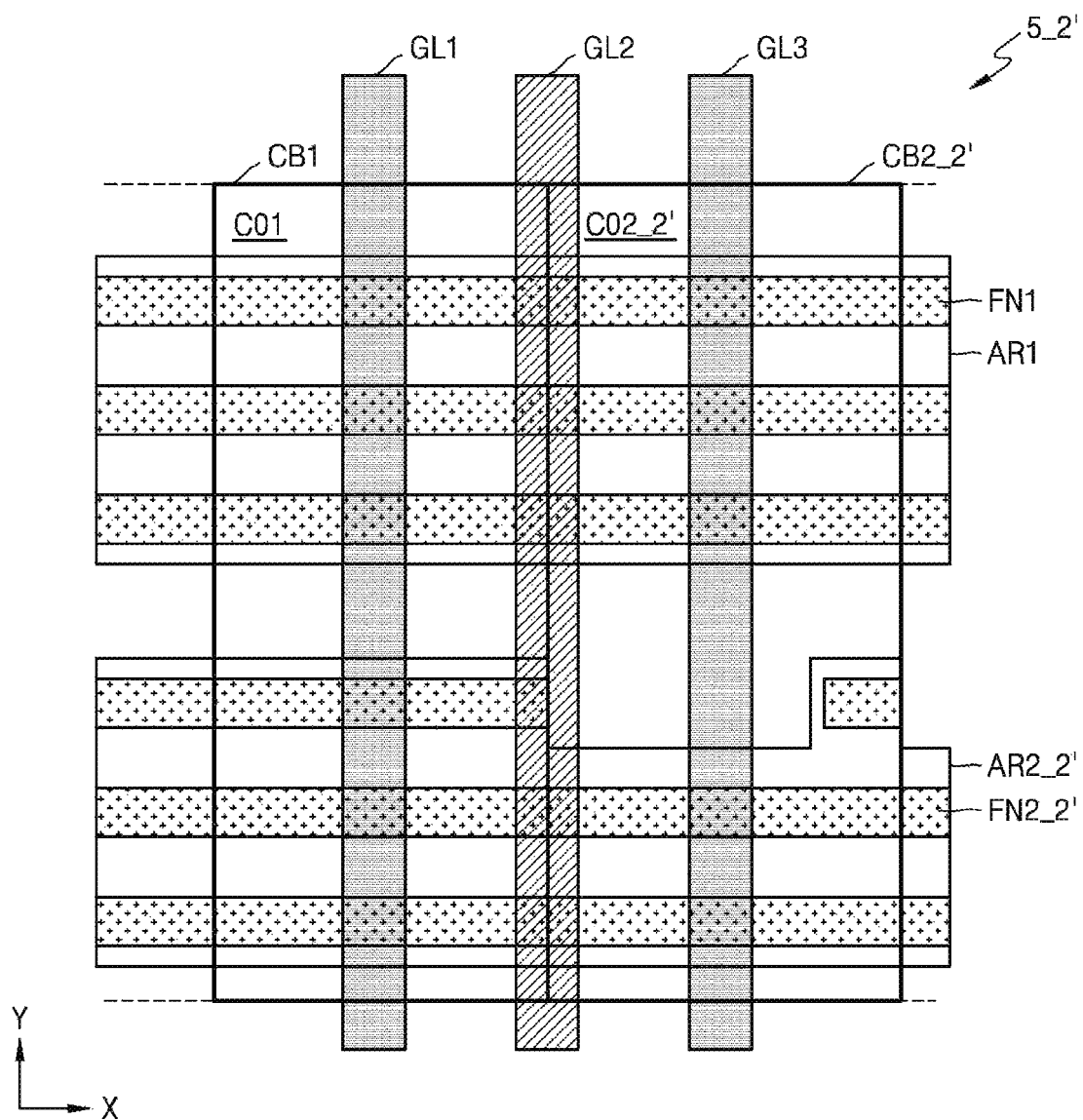

FIGS. 9A and 9B illustrate parts of schematic layouts of ICs according to exemplary embodiments of the inventive concept. In particular, FIGS. 9A and 9B illustrate patterns formed in front-end layers of the first instance C01 and second instances C02_2 and C02_2' included in ICs 5_2 and 5_2'. In FIG. 9A, the first instance C01 and the second instance C02_2 may be defined by cell boundaries CB1 and CB2_2. In FIG. 9B, the first instance C01 and the second instance C02_2' may be defined by cell boundaries CB1 and CB2_2'.

Referring to FIGS. 8 and 9A, the first instance C01 may be located in the layout of the IC 5_2. In an exemplary embodiment of the inventive concept, the first instance C01 may be included in a critical timing path. A context group by which a delay time is relatively reduced may be selected from among a plurality of context groups included in the LLE data D330 of FIG. 3 in consideration of an LLE caused by instances located in the vicinity of the first instance C01. The selected context group may include information about a shape of an active region, by which an active region (e.g., a second active region AR2_2) having an n-type FinFET may have an L shape, and information about a position of the L shape.

Since the second active region AR2_2 of the second instance C02_2 includes three fins at an interface surface adjacent to the first instance C01, the second active region AR2_2 may not be formed in the L shape at the interface surface. Accordingly, the second instance C02_2 may not correspond to the selected context group. However, since the second active region AR2_2 of the second instance C02_2 includes two fins at a surface opposite to the interface surface adjacent to the first instance C01 (e.g., as shown by FN2_2 in FIG. 9A), when the opposite surface is located adjacent to the first instance C01, the second instance C02_2 symmetrically transformed may correspond to the selected context group.

Referring to FIGS. 8, 9A, and 9B, the second instance C02_2 may be symmetrically transformed and rearranged (S235). For example, the first instance C01 and the second instance C02_2 may be arranged adjacent to each other in the X direction, and the second instance C02_2 may be symmetrically transformed about an axis parallel to the Y direction and rearranged. A front-end layer pattern of the rearranged second instance C02_2' may correspond to the selected context group corresponding to the first instance C01.

As shown by fins FN2_2', three fins may be located in the second active region AR2_2' of the first instance C01 at a surface adjacent to the first instance C01 and the rearranged second instance C02_2', and two fins may be located in the second active region AR2_2' of the rearranged second instance C02_2'. Thus, since an L shape of the second active region AR2_2' is formed at an interface surface between the first instance C01 and the second instance C02_2', a distance from the center of the first instance C01 to the L shape of the second active region AR2_2' may be reduced. Thus, a delay time caused by an LLE may be reduced.

Figure 10:
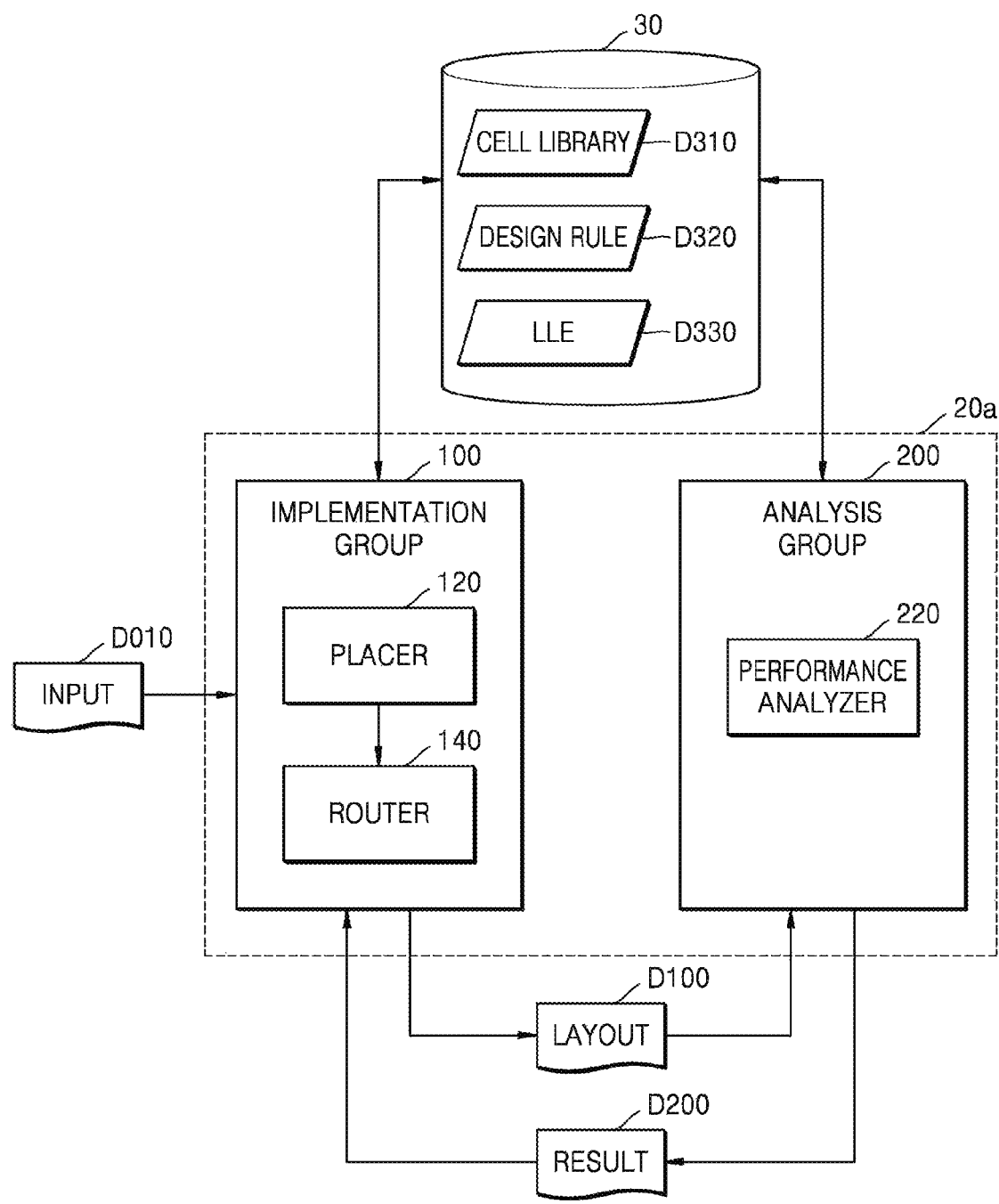
FIG. 10 is a block diagram of the program of FIG. 1, according to an exemplary embodiment of the inventive concept.
Figure 11:
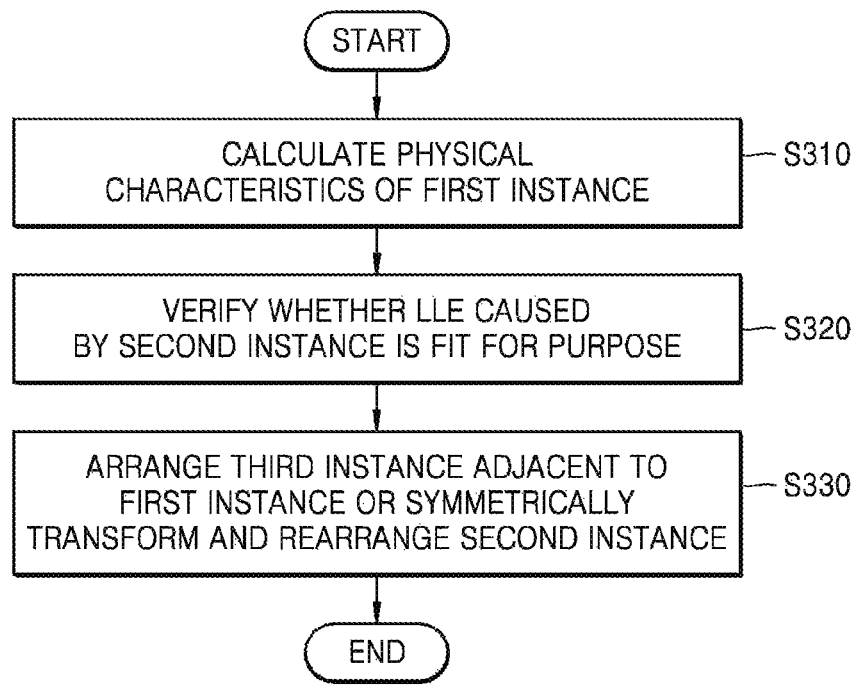
FIG. 11 is a flowchart of a method of designing an IC, according to an exemplary embodiment of the inventive concept.

FIG. 10 is a block diagram of the program of FIG. 1, according to an exemplary embodiment of the inventive concept. FIG. 11 is a flowchart of a method of designing an IC according to an exemplary embodiment of the inventive concept. In FIG. 10, the same reference numerals are used to denote the same elements as in FIG. 3. Thus, a detailed description of the same elements as in FIG. 3 will be omitted for brevity.

Referring to FIGS. 10 and 11, a program 20a may include the implementation group 100 and an analysis group 200. The implementation group 100 and the analysis group 200 may include a plurality of procedures. For example, the implementation group 100 may include procedures (e.g., the placer 120 and the router 140), and the analysis group 200 may include a procedure (e.g. a performance analyzer 220).

The LLE data D330 may include information about variations in physical characteristics of a standard cell due to an LLE. For example, the LLE data D330 may include information about variations in timing conditions or power conditions of the standard cell due to the LLE.

The analysis group 200 may refer to data D310, D320, and D330 stored in the storage medium 30 and generate result data D200 based on layout data D100. The layout data D100 may include physical information about a layout of the IC, for example, data having a graphic data system II (GDSII) format. Although FIG. 11 illustrates a case in which the analysis group 200 accesses the layout data D100 generated by the implementation group 100, the layout data D100 may be generated by a computing system different from the one configured to perform the analysis group 200 and then be provided to the analysis group 200. The analysis group 200 may analyze performance of the IC based on the layout data D100 and generate result data D200 including information about the performance of the IC.

The performance analyzer 220 may analyze the performance of the IC based on physical characteristics of an instance included in the layout data D100 and generate the result data D200. For example, the performance analyzer 220 may analyze timing characteristics, power characteristics, and noise characteristics of the IC. Additionally, the performance analyzer 220 may refer to information about requirements of the IC included in the input data D010 and generate the result data D200 including a result obtained by determining whether the performance of the IC satisfies requirements. Accordingly, the performance analyzer 220 may calculate physical characteristics of the first instance (e.g., C01 in FIG. 2A) (S310). Thus, it may be verified whether an LLE caused by the second instance (e.g., C02 in FIG. 2A) located adjacent to the first instance is fit for the purpose (S320). In other words, it may be determined whether the calculated physical characteristics of the first instance C01 meet predetermined thresholds.

The implementation group 100 may access the result data D200 including information about the performance of the IC, which is generated by the analysis group 200 based on the layout data D100. Based on the result data D200, the implementation group 100 may change the layout of the IC depending on whether the performance of the IC based on the layout data D100 satisfies the requirements of the IC, which are included in the input data D010, and may generate new layout data D100 indicating the changed layout. The result data D200 may include a variation in performance of the IC due to the LLE, and the implementation group 100 may generate the new layout data D100 indicating a layout of an IC that is optimally designed based on the result data D200.

In an exemplary embodiment of the inventive concept, when the LLE caused by the second instance (e.g., C02 in FIG. 2A) located adjacent to the first instance (e.g., C01 in FIG. 2A) of a target standard cell is not fit for the purpose, the implementation group 100 may arrange a third instance in place of the second instance or rearrange the second instance such that a surface of the second instance adjacent to the first instance is symmetric to an opposite surface of the adjacent surface, based on the layout data D100 (S330). Operation S330 may be performed in a similar manner to operation S250 or S255 of FIG. 8. The target standard cell may be a standard cell which is the target of an appropriate LLE.

Figure 12:
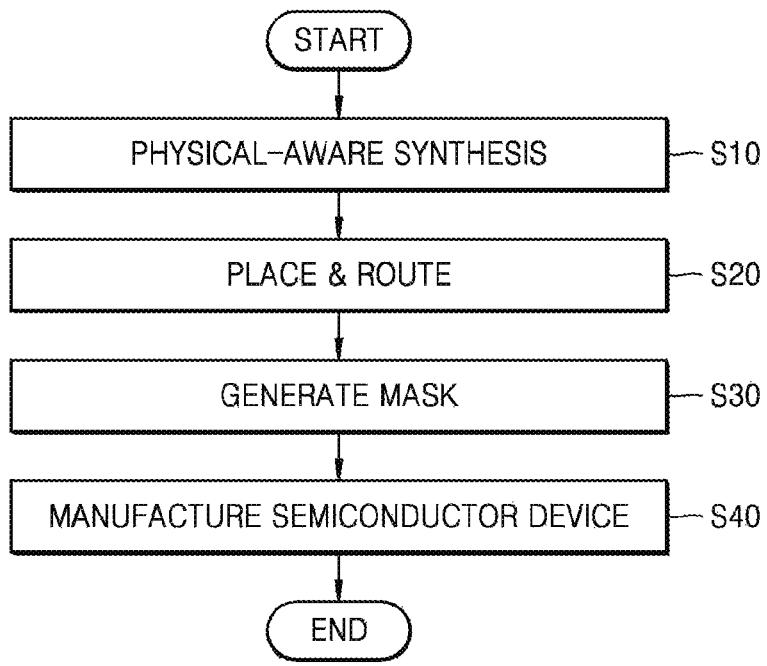
FIG. 12 is a flowchart of a method of manufacturing a semiconductor device, according to an exemplary embodiment of the inventive concept.

FIG. 12 is a flowchart of a method of manufacturing a semiconductor device according to an exemplary embodiment of the inventive concept.

Referring to FIG. 12, the method of manufacturing the semiconductor device may be divided into a process of designing an IC and a process of manufacturing the IC. The process of designing the IC may include operations S10 and S20, and the process of manufacturing the IC may include operations S30 and S40. The process of manufacturing the IC based on layout data may be performed by a semiconductor process module.

In operation S10, a physical-aware synthesis operation may be performed. For example, operation S10 may be performed by a processor using a synthesis tool. A term "synthesis" may be an operation of generating a netlist by converting input data of an IC into a hardware type including logic gates and referred to as "logic synthesis". The input data may be an abstract type of a behavior of the IC, for example, data defined at a register transfer level (RTL). The netlist may be generated from an RTL code by using a standard cell library and be a gate-level netlist.

In operation S20, a place-and-route (P&R) operation may be performed. For example, operation S20 may be performed by a processor using a P&R tool. For example, standard cells defining the IC may be arranged based on the netlist, and nets included in the arranged standard cells may be routed to generate layout data of the IC.

According to the method of manufacturing the semiconductor device according to an exemplary embodiment of the inventive concept, the semiconductor device may be manufactured by performing the method of designing the IC, which has been described above with reference to FIGS. 1 to 11. For example, operation S20 may include operations S110 to S140 of FIG. 4, operations S210 to S270 of FIG. 7, or operations S240 to S265 of FIG. 8, and repeated descriptions thereof will be omitted.

In operation S30, a mask may be generated based on layout data. For example, initially, optical proximity correction (OPC) may be performed based on the layout data. The OPC may refer to an operation of changing a layout based on an error caused by an optical proximity effect. Thereafter, the mask may be manufactured according to the changed layout based on an OPC performance result. In this case, the mask may be manufactured by using the OPC-based layout, for example, an OPC-based GDSII.

In operation S40, a semiconductor device in which the IC is embodied may be manufactured by using the mask. For example, various semiconductor processes may be performed on a semiconductor substrate, such as a wafer, by using a plurality of masks to form the semiconductor device in which the IC is embodied. For example, a process using a mask may refer to a patterning process using a lithography process. A desired pattern may be formed on the semiconductor substrate or a material layer by using the patterning process. Meanwhile, a semiconductor process may include a deposition process, an etching process, an ion process, and a cleaning process. Additionally, the semiconductor process may include mounting a semiconductor device on a printed circuit board (PCB) and encapsulating the semiconductor device with an encapsulant. Alternatively, the semiconductor process may include testing a semiconductor device or a package.

While the inventive concept has been particularly shown and described with reference to exemplary embodiments thereof, it will be understood by those of ordinary skill in the art that various changes in form and details may be made thereto without departing from the spirit and scope of the inventive concept, as set forth by the following claims.

What is claimed is:

1. A method of manufacturing an integrated circuit (IC) comprising instances of standard cells, the method comprising:
    arranging a first instance; and
    arranging a second instance adjacent to the first instance, wherein the second instance has a front-end layer pattern corresponding to a context group of the first instance,
    wherein the context group comprises information of front-end layer patterns of instances, the front-end layer patterns causing a same local layout effect (LLE) on the first instance and arranged adjacent to the first instance,
    wherein each of the first instance and the second instance comprises an active region in which a fin field-effect transistor (FinFET) is formed, and
    wherein, at a surface adjacent to the first instance and the second instance, a number of fins included in the active region of the first instance is greater than a number of fins included in the active region of the second instance.

2. The method of claim 1, wherein the context group comprises information of patterns formed in a front-end layer that causes an LLE by which a delay time of the first instance is reduced.

3. The method of claim 2, wherein
the FinFET is an n-type FinFET.

4. The method of claim 1, wherein the context group comprises information of patterns formed in a front-end layer that causes an LLE by which power consumption of the first instance is reduced.

5. The method of claim 4, wherein
the FinFET is a p-type FinFET.

6. The method of claim 1, further comprising generating layout data of the IC by routing connections between the first instance and the second instance.

7. The method of claim 6, further comprising:
    calculating physical characteristics of the first instance according to the arranging of the second instance, using the layout data; and
    determining whether the calculated physical characteristics meet predetermined thresholds.

8. The method of claim 1, wherein the context group comprises information of a shape of an active region formed at an interface surface of the first instance.

9. A method of manufacturing a semiconductor device comprising an integrated circuit (IC), the method comprising:
    designing the IC to generate layout data including instances of a standard cell; and
    manufacturing the IC using the layout data,
    wherein designing the IC comprises:
    arranging a first instance, and arranging a second instance adjacent to the first instance in a first direction; and
    determining whether a front-end layer pattern of the second instance corresponds to a context group of the first instance,
    wherein the context group of the first instance comprises information of front-end layer patterns of the instances, the front-end layer patterns causing a same local layout effect (LLE) on the first instance and located adjacent to the first instance,
    wherein designing the IC further comprises determining whether a pattern corresponds to the context group of the first instance,
    wherein the pattern is symmetric to the front-end layer pattern of the second instance about an axis parallel to a second direction, and the second direction is substantially perpendicular to the first direction, and
    wherein the method further comprises symmetrically transforming the second instance about the axis parallel to the second direction and rear ran nine the second instance when the pattern symmetric to the front-end layer pattern of the second instance corresponds to the context group of the first instance.

10. The method of claim 9, further comprising arranging a third instance instead of the second instance when the front-end layer pattern of the second instance does not correspond to the context group of the first instance,
    wherein the third instance serves substantially the same function as the second instance, and a front-end layer pattern of the third instance corresponds to the context group of the first instance.

11. The method of claim 9, wherein determining whether the front-end layer pattern of the second instance corresponds to the context group of the first instance comprises determining whether an active region has an L shape at an interface surface between the first instance and the second instance.

12. The method of claim 11, wherein, at the interface surface, a number of active fins included in an active region of the first instance is greater than a number of active fins included in an active region of the second instance.

13. The method of claim 9, further comprising selecting, from among a plurality of context groups, the context group of the first instance corresponding to an LLE to act on the first instance.

14. A computing system configured to manufacture an integrated circuit (IC) comprising instances of standard cells, the computing system comprising:
- a memory configured to store information including procedures; and
- a processor configured to access the memory and execute the procedures,
- wherein the procedures comprise:
- an instance placer configured to arrange a first instance and a second instance, among the instances of standard cells, wherein an active region of the second instance has a shape corresponding to a context group of the first instance; and
- a router configured to route the instances and generate a layout of the IC,
- wherein the context group comprises information of active regions of the instances, the active regions of the instances causing a same LLE on the first instance and located adjacent to the first instance,
- wherein each of the first instance and the second instance has a fin field-effect transistor (FinFET) structure, and
- wherein the instance placer arranges the second instance based on a number of fins included in the active region of the second instance.

15. The computing system of claim 14, wherein when the first instance is included in a critical timing path, each of the first instance and the second instance comprises an active region in which an n-type FinFET is formed, and
- the number of fins included in the active region of the first instance is greater than a number of fins included in the active region of the second instance.

16. The computing system of claim 14, wherein the procedures further comprise a performance analyzer configured to calculate physical characteristics of the first instance according to the arranging of the second instance and determine whether the calculated physical characteristics meet predetermined thresholds to verify whether an LLE that is fit for a purpose has occurred.

17. The computing system of claim 16, wherein when the LLE that is fit for the purpose has not occurred, the instance placer arranges a third instance instead of the second instance,
- the third instance serves substantially the same function as the second instance,
- a shape of an active region of a surface of the third instance is different than a shape of the active region of a surface of the second instance, and
- the surface of the third instance is adjacent to the first instance.

* * * * *